(12) United States Patent
Fukue

(10) Patent No.: US 7,456,804 B2
(45) Date of Patent: Nov. 25, 2008

(54) DISPLAY CONTROL APPARATUS AND DISPLAY CONTROL METHOD

(75) Inventor: Tetsu Fukue, Takatsuki (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 11/098,619

(22) Filed: Apr. 5, 2005

(65) Prior Publication Data
US 2005/0280601 A1 Dec. 22, 2005

(30) Foreign Application Priority Data
Apr. 5, 2004 (JP) ............................ P2004-110738

(51) Int. Cl.
G09G 5/00 (2006.01)
(52) U.S. Cl. .............................. 345/1.1; 345/2.3; 345/4; 345/531; 345/536; 345/537
(58) Field of Classification Search ........... 345/1.1–2.3, 345/4, 213, 531, 536, 537
See application file for complete search history.

(56) References Cited

U.S. PATENT DOCUMENTS 5,710,570 A * 1/1998 Wada et al. ................. 345/3.2
6,020,863 A * 2/2000 Taylor ........................ 345/3.1
6,184,905 B1 2/2001 Hartog
6,522,309 B1 * 2/2003 Weber ........................ 345/1.1
2002/0149541 A1 * 10/2002 Shin .......................... 345/3.1

OTHER PUBLICATIONS

LCD/CRT 2D Graphic Subsystem Data Book, Version 0.08, May 26, 2000 (nVIDIA Corporation).

* cited by examiner

Primary Examiner—Bipin Shalwala
Assistant Examiner—Vince E Kovalick
(74) Attorney, Agent, or Firm—McDermott Will & Emery LLP

(57) ABSTRACT

A display control apparatus has a synchronizing signal generating section which generates a display synchronizing signal, a bus access control section which reads out video data for a plurality of system, one system at a time, from a local memory, a screen combining section which processes to combine video data which was readout, and video data for use in combining, sequentially, a buffer section which stores video data which was processed to be combined, and the video data for use in combining, a buffer control section which controls an access to the buffer section, a display IF section which reads out video data that the buffer section stores, and outputs the video data to each of display monitors in accordance with a display synchronizing signal, and display output selecting means which selects an output destination of video data for plural systems, which the display IF section outputs.

14 Claims, 8 Drawing Sheets

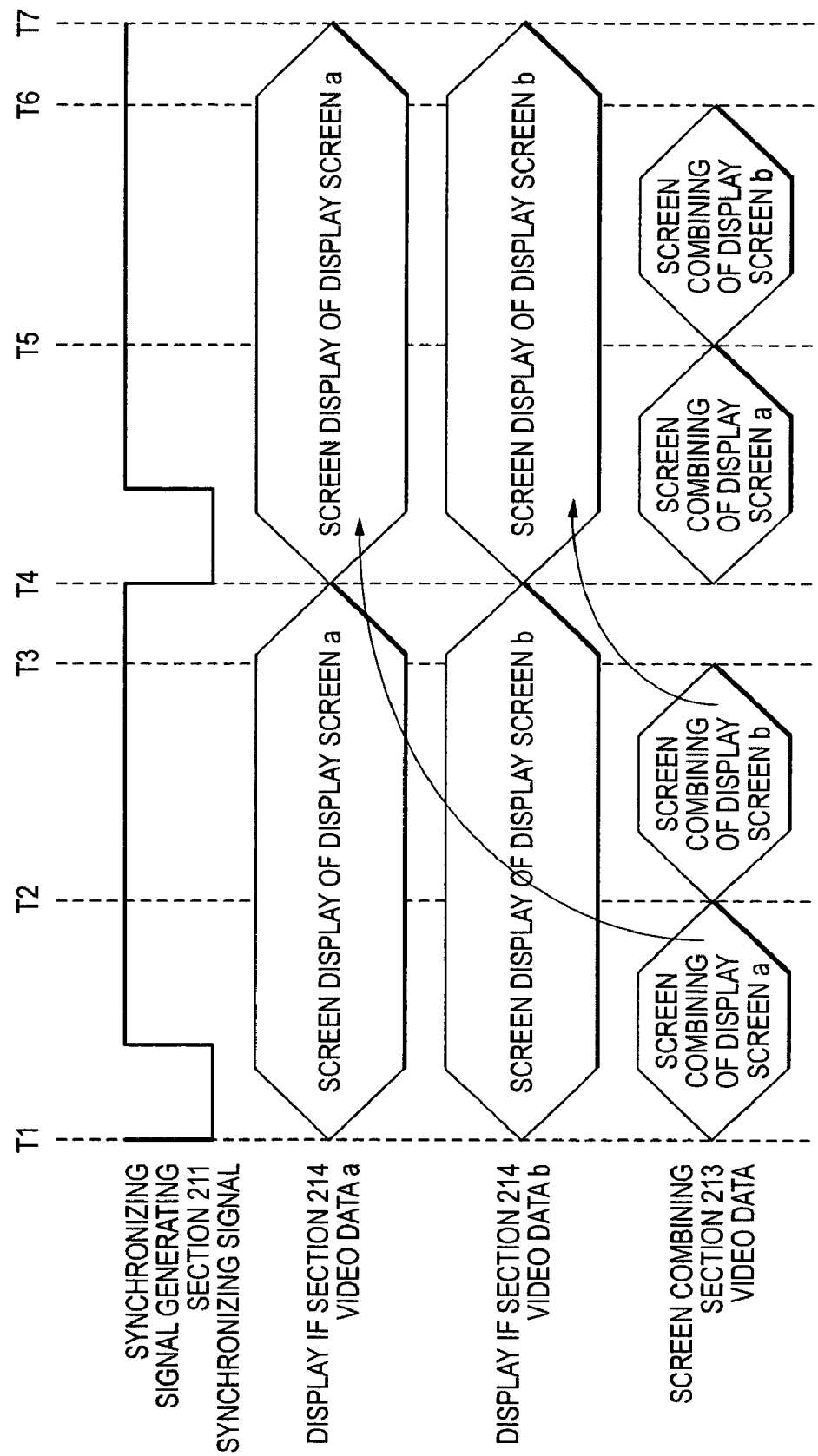

DISPLAY CONTROL APPARATUS AND DISPLAY CONTROL METHOD

This application is based on Japanese Patent Application No. 2004-110738, which is incorporated herein by reference.

BACKGROUND OF THE INVENTION

1. Field of the Invention

This invention relates to a display control apparatus and a display control method, which displays an image on each of a plurality of display devices.

2. Description of the Related Art

FIG. 9 is a schematic block diagram of one example of a related display control apparatus. In the past, in order to display an independent image on each of a plurality of display monitors (display monitors a 400, b 500), a display control apparatus 100 is equipped with display units (display units a 260, b 270) of the same number of the display monitors, and took such a configuration that each display unit is directly connected to an internal bus 230 (e.g., see LCD/CRT 2D Graphic Subsystem Data Book, Version 0.08, May 26, 2000 (nVIDIA Corporation)).

The display control apparatus 100, which is shown in FIG. 9, is equipped with a memory interface 240, a display unit a 260, a display unit b 270 and other internal blocks 220, which were connected by the internal bus 230.

The display unit a 260 is connected to a display monitor a 400, and has, in an inside of the display unit a 260, a synchronizing signal generating section 261, a bus access control section 262, a screen combining section 263, a buffer control section 265, a buffer section 266 and a display IF section 264. The display unit b 270 is connected to a display monitor b 500, and is of a similar configuration to the display unit a 260. The memory interface 240 is directly connected to a local memory 300 which is provided outside an display control apparatus 100, and arbitrates use request signals of the internal bus 230, from the display unit a 260, the display unit b 270, and other internal blocks 220, and issues a use permission signal of the internal bus 230 to any one of them.

The synchronizing signal generating section 261, which is provided in an inside of the display unit a 260, generates a display synchronizing signal which corresponds to an image that the display monitor a 400 displays. The bus access control section 262 outputs a use request signal of the internal bus 230, to the memory interface 240, at timing of the synchronizing signal, in accordance with an image display parameter which is set up by a register etc. The bus access control section 262 receives an internal bus use permission signal from the memory interface 240, and then, reads out video data which is stored on the local memory 300, through the internal bus 230, and outputs the video data to the screen combining section 263.

The screen combining section 263 applies screen combining processing to video data which is inputted from the bus access control section 262 and video data which is read out from the buffer section 266 through the buffer control section 265, in accordance with a screen combining parameter which is given by register setup etc., and stores video data, which was processed to be combined, in the buffer section 266 through the buffer control section 265. The display IF section 264 reads out video data which is stored in the buffer section 266, through the buffer control section 265, in accordance with timing of the synchronizing signal, and outputs the video data and the synchronizing signal to the display monitor a 400.

In addition, the buffer section 266 is configured by two buffers, and one buffer is connected to the screen combining section 263 through the buffer control section 265, and carries out an input of video data from the screen combining section 263 and an output of video data to the screen combining section 263, and the other buffer is connected to the display IF section 264 through the buffer control section 265, and outputs video data to the display IF section 264.

The buffer control section 265 switches a connection relation of the buffer section 266 and the screen combining section 263 and the display IF section 264 every certain fixed cycle (e.g., one cycle of the synchronizing signal), and carries out such double buffering processing that it outputs video data to the display IF section 264, from a buffer which has stored video data outputted from the screen combining section 263 in an immediately preceding cycle, and stores video data which was outputted from the screen combining section 263, in a buffer which outputted video data to the display IF section 264 in an immediately preceding cycle, at the same time, and outputs this to the display IF section 264 in an immediately following cycle. The buffer control section 265 outputs video data which is displayed on the display monitor a 400, to the display IF section 264, without a break, by the double buffering processing.

The display unit b 270 carries out similar processing to that of the display unit a 260, and outputs video data to the display monitor b 500. In addition, the display monitor a 400 and the display monitor b 500 display video data which was output from the display unit a 260 and the display unit b 270 respectively, on screens.

However, in the related display control apparatus, in order to display images on a plurality of display devices, there is a necessity to have a plurality of display units, and there is such circumstances that a circuit size gets larger, and cost increases.

SUMMARY OF THE INVENTION

The invention is a thing which was made in view of the circumstances, and aims to provide a display control apparatus and a display control method, by which it is possible to output respective video data on a plurality of display devices by use of one display unit, without disposing a plurality of display units, and it is possible to reduce a circuit size and cost.

A display control apparatus of the invention is equipped with a display unit which displays an image on each of a plurality of display devices with identical image size in accordance with an identical display synchronizing signal, and in which a local memory, which stores video data for a plurality of systems being displayed on the plurality of display devices, and the display unit are connected through an internal bus, and the display unit has a synchronizing signal generating section which generates the display synchronizing signal, a bus access control section which reads out the video data for a plurality of systems, one system at a time from the local memory, a screen combining section which processes to combine the video data which was read out, and video data for use in combining, sequentially, a buffer section which stores video data which was processed to combine, and the video data for use in combining, and a display IF section which reads out video data that the buffer section stores, in accordance with the display synchronizing signal, and outputs the video data to the plurality of display devices, respectively.

According to the above-described configuration, the bus access control section, the screen combining section, the buffer section and the display IF section of the display unit handle video data for a plurality of systems, and thereby, it is possible to output respective video data to a plurality of display devices by use of one display unit, without disposing a plurality of display units, and therefore, it is possible to reduce a circuit size and cost.

In addition, a display control apparatus of the invention is equipped with a display unit which displays an image on each of a plurality of display devices with identical image size in accordance with a plurality of display synchronizing signals, respectively, and in which a local memory, which stores video data for a plurality of systems being displayed on the plurality of display devices, and the display unit are connected through an internal bus, and the display unit has a plurality of synchronizing signal generating sections which generate the plurality of display synchronizing signals respectively, a bus access control section which reads out the video data for a plurality of systems, one system at a time from the local memory, a screen combining section which processes to combine the video data which was read out, and video data for use in combining, sequentially, a buffer section which stores video data which was processed to combine, and the video data for use in combining, and a display IF section which reads out video data that the buffer section stores, in accordance with each of the plurality of display synchronizing signals, and output sit to the plurality of display devices, respectively, and the bus access control section determines video data which is read out from the local memory in accordance with the plurality of display synchronizing signals and a signal which shows whether combining processing for one system has completed or not.

According to the above-described configuration, video data, which is read out from the local memory, is determined in accordance with the plurality of display synchronizing signals and a signal which shows whether combining processing for one system has completed or not, and thereby, even in case that a data amount of video data is different with respect to each system, the image combing section carries out processing of a next system after combing processing of all video data for one system was completed, and there occurs no case that video data is outputted to a display device in such a state that combining processing of a part of the video data has not yet completed. Therefore, even in case that screen sizes and display synchronizing signals of a plurality of display devices are different, it is possible to output respective video data to a plurality of display devices by use of one display unit, without disposing a plurality of display units, and therefore, it is possible to reduce a circuit size and cost.

In addition, in the display control apparatus of the invention, the display unit has a converter which applies digital/analog conversion to at least one of the video data for a plurality of systems which the display IF section outputs. According to the above-described configuration, digital/analog conversion is applied to at least one of the video data for a plurality of systems which the display IF section outputs, and thereby, on the occasion of realizing this display control apparatus as LSI, it is possible to reduce the number of terminals, as compared with a case in which a display device is configured by a digital monitor.

In addition, in the display control apparatus of the invention, the display unit has output destination selecting means which selects an output destination of the video data for a plurality of systems which the display IF section outputs. According to the above-described configuration, by selecting an output destination of video data for a plurality of systems which the display IF section outputs, it is possible to select a huge variety of display modes.

In addition, in the display control apparatus of the invention, the display IF section accesses to the buffer section in a time division manner. According to the above-described configuration, the display IF section accesses to the buffer section in a time division manner, and thereby, it is possible to read out video data for a plurality of systems with respect to each system, from the buffer section in a single area.

In addition, in the display control apparatus of the invention, the display IF section accesses to the buffer section simultaneously. According to the above-described configuration, the display IF section accesses to the buffer section at the same time, and thereby, it is possible to read out video data for a plurality of systems from a plurality of buffer sections indifferent areas, by one access, and an overall processing speed increases.

In addition, a display control method of the invention displays an image on each of a plurality of display devices with identical screen size in accordance with an identical display synchronizing signal, and has a read-out step which reads out video data for a plurality of systems which are displayed on the plurality of display devices, one system at a time, an combining processing step which processes to combine video data which was readout, and video data for use in combing, sequentially, and an output step which reads out video data which was processed to be combined, in accordance with the display synchronizing signal, and outputs the video data to each of the plurality of display devices.

In addition, a display control method of the invention displays an image on each of a plurality of display devices with identical screen size in accordance with a plurality of display synchronizing signals, and has a readout step which reads out video data for a plurality of systems which are displayed on the plurality of display devices, one system at a time, an combining processing step which processes to combine video data which was readout, and video data for use in combing, sequentially, and an output step which reads out video data which was processed to be combined, in accordance with each of the plurality of display synchronizing signals, and outputs the video data to each of the plurality of display devices, and the readout step determines video data which is read out in accordance with the plurality of display synchronizing signals and a signal which shows whether combining processing for one system was completed or not.

Further, the display control method of the invention has a conversion step which applies digital/analog conversion to at least one of the video data for a plurality of systems which was outputted to each of the plurality of video devices.

According to the invention, the bus access control section, the screen combining section, the buffer section and the display IF section of the display unit handle video data for a plurality of systems. Thereby, it is possible to output respective video data to a plurality of display devices by use of one display unit, without disposing a plurality of display units, and therefore, it is possible to reduce a circuit size and cost.

BRIEF DESCRIPTION OF THE DRAWINGS

FIG. 4 is a timing chart for explaining an operation example of the display control apparatus shown in FIG. 1;

DETAILED DESCRIPTION OF THE PREFERRED EMBODIMENTS

First Embodiment

Figure 1:
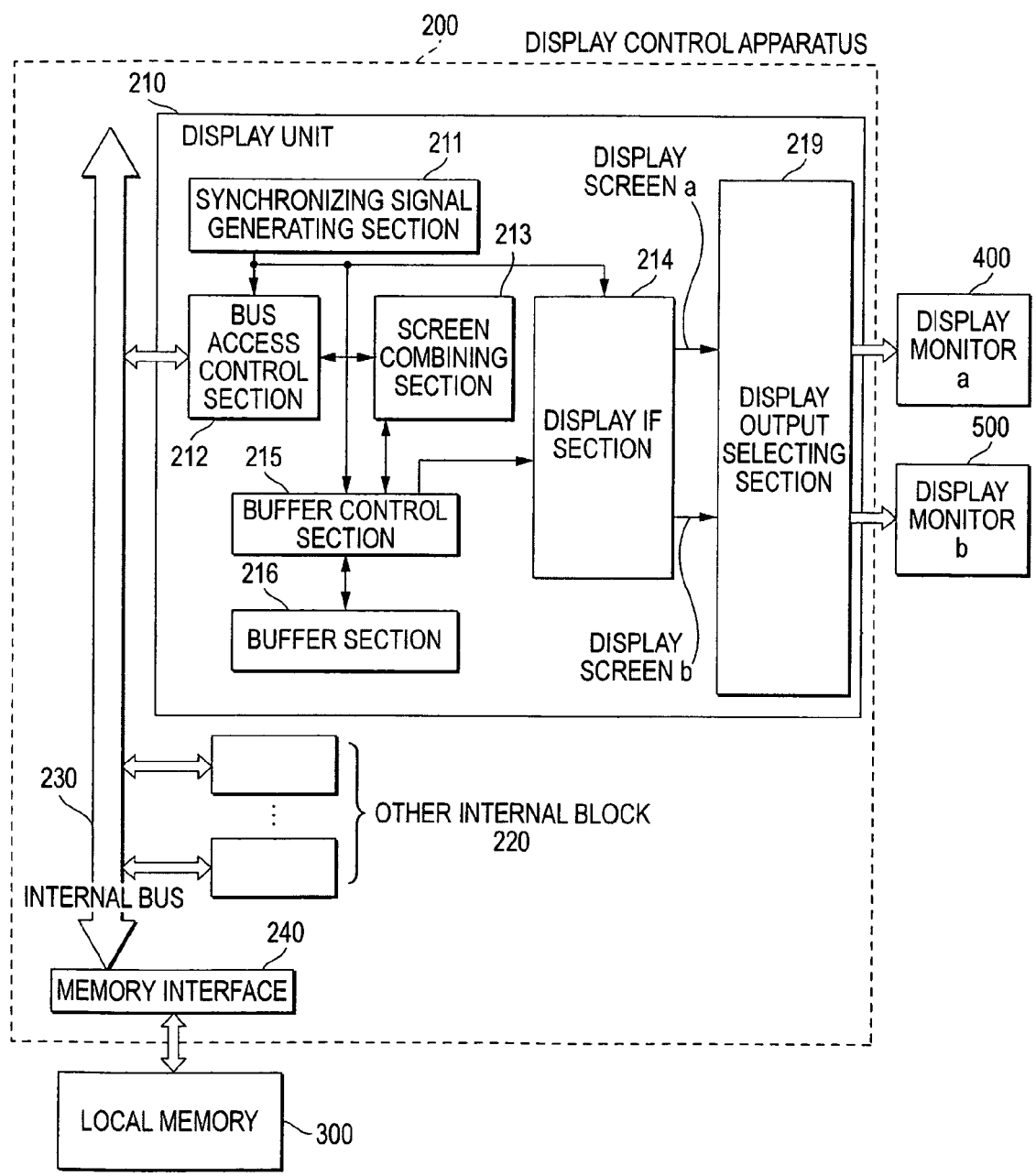
FIG. 1 is a schematic block diagram of a display control apparatus for explaining a first embodiment of the invention.

FIG. 1 is a schematic block diagram of a display control apparatus for explaining a first embodiment of the invention. A display control apparatus 200 is a thing which is equipped with a display unit 210 which displays an image on each of a plurality of display monitors (display monitors a 400, b 500) with identical image size in accordance with an identical display synchronizing signal, and in which a local memory 300, which stores video data for a plurality of systems being displayed on the plurality of display monitors a 400, b 500, and the display unit 210 are connected through an internal bus 230.

The display unit 210 has a synchronizing signal generating section 211 which generates the display synchronizing signal, a bus access control section 212 which reads out the video data for a plurality of systems from the local memory one system at a time, a screen combining section 213 which processes to combine the video data which was read out, and video data for use in combining, sequentially, a buffer section 216 which stores video data which was processed to combine, and the video data for use in combining, a buffer control section 215 which controls an access to the buffer section 216, a display IF section 214 which reads out video data that the buffer section 216 stores, in accordance with the display synchronizing signal, and outputs it to each of the display monitors a 400, b 500, respectively, and display output selecting means 219 which selects an output destination of video data for a plurality of systems which the display IF section 214 outputs.

Other internal block 220 issues a use request of the internal bus 230, on the occasion of accessing to the local memory 300. A memory interface 240 arbitrates a use request signal of the internal bus 230, which is issued on the occasion of writing to the local memory 300 from the display unit 210 and other internal blocks 220 and reading from the local memory 300, and outputs a use permission signal of the internal bus 230, to one block out of a plurality of blocks. A block, which received use permission of the internal bus 230, carries out writing to the local memory 300 and reading from the local memory 300, through the internal bus 230.

The synchronizing signal generating section 211 generates a synchronizing signal which is adapted to the display monitor a 400 and the display monitor b 500, and outputs the synchronizing signal to the bus access control section 212, the buffer control section 215, and the display IF section 214. The bus access control section 212 reads out video data for one line, out of video data for a plurality of screens (plural systems) which is stored on the local memory 300, through the internal bus 230, in accordance with a synchronizing signal from the synchronizing signal generating section 211 and a display parameter such as a display position and a display size, which is given by register setup, and outputs it to the screen combining section 213. Meanwhile, the bus access control section 212 reads out video data for a plurality of systems, with respect to each horizontal synchronizing signal.

The screen combining section 213 prepares video data for one screen, by applying screen combining processing to video data for a plurality of screens, and stores the prepared video data in the buffer section 216. In particular, the screen combining section 213 carries out screen combining processing of video data for one system, which the bus access control section 212 read out, in accordance with a parameter which is given by register setup etc., and video data which is temporarily stored in the buffer section 216, and stores a processing result in the buffer section 216. In addition, the screen combining section 213 carries out screen combining with a background color which has been stored in the buffer section 216 as an initial value and is arbitrarily given by register setup etc., to video data for one line of first one screen out of video data which the bus access control section 212 read out, and carries out screen combining of a combining result up to a (m−1)-th screen, which is stored in the buffer section 216, and video data for one line of a m-th screen, as combining processing for one line of a m-th screen (m is an integer of 2 or more).

Figure 2:
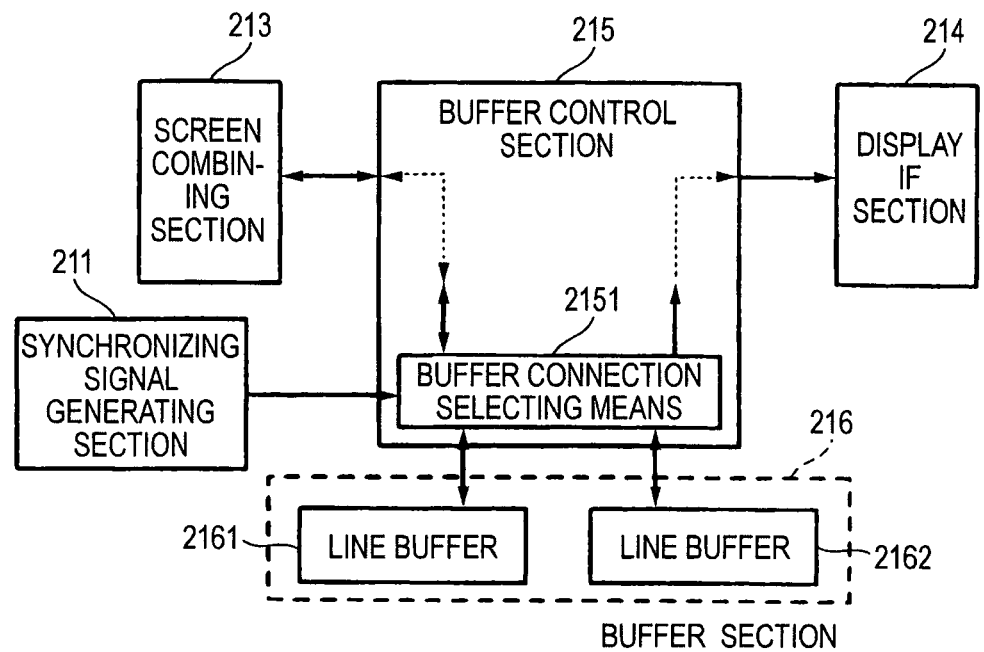
FIG. 2 is a view which explains the buffer section and the buffer control section in the first embodiment.

FIG. 2 is a view which explains the buffer section and the buffer control section in the first embodiment. The buffer section 216 is a line buffer which stores video data for one line. The buffer control section 215 has buffer connection selecting means 2151 in its inside, and receives an access request from the screen combining section 213 and the display IF section 214 to the buffer section 216, and carries out writing of video data to the buffer section 216 and reading from the buffer section 216.

The buffer section 216 is composed of a line buffer 2161 and a line buffer 2162, and is connected to the buffer connection selecting means 2151 which is provided in an inside of the buffer control section 215. The buffer connection selecting means 2151 connects one of the line buffer 2161 and the line buffer 2162, to the screen combining section 213 through the buffer control section 215, and connects the other to the display IF section 214 through the buffer control section 215, and switches a connection relation every one cycle of a horizontal synchronizing signal from the synchronizing signal generating section 211, and carries out screen combining and screen display at the same time, by double buffering control.

The buffer connection selecting means 2151 connects the line buffer 2161 to the screen combining section 213, the line buffer 2162 to the display IF section 214, in a certain cycle, and connects the line buffer 2161 to the display IF section 214, the line buffer 2162 to the screen combining section 213, in a next cycle. Then, the buffer connection selecting means 2151 outputs video data for one line, which was combined in the screen combining section 213 in an immediately preceding cycle, to any one of the display monitor a 400 and the display monitor b 500 through the display IF section 214.

The display IF section 214 reads out video data for two systems, from the buffer section 216 through the buffer control section 215, in accordance with a synchronizing signal from the synchronizing signal generating section 211, and outputs it to the display monitor a 400 and the display monitor b 500 as a display screen a and a display screen b, through display output selecting means 219.

Figure 3A:
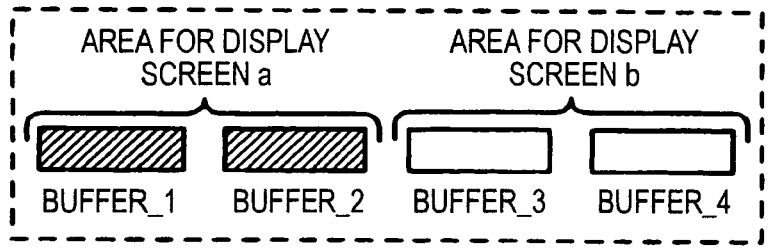
FIG. 3 is a view which shows a configuration example of the buffer section.
Figure 3B:
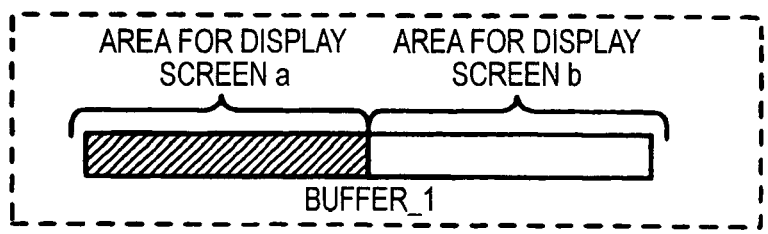
Figure 3C:
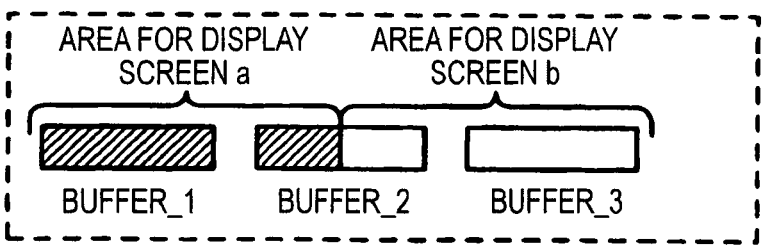

FIG. 3 is a view which shows a configuration example of the buffer section. The line buffer 2161 and the line buffer 2162 are composed of one or a plurality of buffers. FIG. 3(1) shows such a configuration that the line buffer 2161 and the line buffer 2162 are composed of two buffer groups respectively, and one is used as a buffer which stores video data to be outputted as the display screen a, and the other is used as a buffer which stores video data to be outputted as the display screen b (configuration example 1). In addition, FIG. 3(2) shows such a configuration that one buffer is divided into two pieces, and video data to be outputted as the display screen a is stored in one, and the other is used as a buffer which stores video data to be outputted as the display screen b (configuration example 2). Further, FIG. 3(3) shows such a configuration that, among a plurality of buffers, several buffers are used as a buffer which stores video data to be outputted as the display screen a, and other several buffers are used as a buffer which stores video data to be outputted as the display screen a and the display screen b, and yet other several buffers are used as a buffer which stores video data to be outputted as the display screen b (configuration example 3).

In case that both of video data which is outputted as the display screen a and video data which is outputted as the display screen b are stored on one buffer, the display IF section 214 issues a reading request of video data which is outputted to the display monitor b 500, to the buffer control section 215, for example, one cycle of a display dot clock behind a reading request of video data which is outputted to the display monitor a 400, and thereby, can output video data for two systems to the buffer section 216. In this manner, the display IF section 214 accesses to the buffer section 216 in a time division manner, and thereby, it is possible to readout video data for a plurality of systems, from the buffer section in a single area, with respect to each system. In addition, in case that video data which is outputted to the display monitor a 400 and video data which is outputted to the display monitor b 500 are stored on different buffers, it is all right if the display IF section 214 issues a simultaneous reading request to the buffer section 215, to video data for two systems.

The display output selecting means 219 can select and output one of four outputs of outputting video data of the display screen a to the display monitor a 400 and the display monitor b 500, outputting video data of the display screen b to the display monitor a 400 and the display monitor b 500, outputting video data of the display screen a to the display monitor a 400 and video data of the display screen b to the display monitor b 500, outputting video data of the display screen a to the display monitor b 500 and video data of the display screen b to the display monitor a 400, among output signals of the display IF section 214, by register setup or terminal setup.

In addition, it is also all right even if it is configured in such a manner that a digital/analog converter, which converts at least one of video data for a plurality of systems that the display output selecting means 219 outputs, into an analog signal, is provided in the display unit 210, and video data, which was converted into an analog signal, is outputted to the display monitor a 400. In this case, on the occasion of realizing the display control apparatus 200 as LSI, it is possible to reduce the number of terminals, as compared with a case in which both of the display monitor a 400 and the display monitor b 500 are configured by digital monitors. In addition, it is also all right if it is configured in such a manner that the display monitor b 500 is composed of an analog monitor, or in such a manner that two digital/analog converters are provided in the display unit 210, and both of the display monitor a 400 and the display monitor b 500 are composed of analog monitors.

In addition, it is desirable to make such a configuration that selecting means, which selects a screen output mode, is provided in the display unit 210, and it is possible to select a one-screen mode for displaying one screen having a screen width which corresponds to a buffer size of the buffer section 216, and a two-screen mode for displaying two screen having an ½ width of a maximum screen width which can be displayed in the one-screen mode. For example, in case that a buffer size of a line buffer section was of 2048 pixels, it is desirable to make a configuration of selecting an one-screen mode for displaying one screen in which the number of maximum pixels is 1024 pixels, and a two-screen mode for displaying independent screens on two screens in which the number of maximum pixels, which can be displayed in one line, is 512 pixels.

In addition, video data for one screen is divided into left and right portions and they are stored on the local memory 300, and on the occasion of carrying out screen combining processing, screen combining processing is carried out without recognizing a border of display areas of two screens, in a line buffer, and thereby, it is possible to realize display like pseudo one screen by continuing two screens from side to side (junction mode display). That is, it is possible to display such two screens that one screen was divided into two pieces in a traverse direction. Meanwhile, it is possible to select the junction mode display, and a non-junction display mode in which it is possible to display non-junctural two screens, by register setup and terminal setup.

FIG. 4 is a timing chart for explaining an operation example of the display control apparatus shown in FIG. 1. Meanwhile, signals, which are described in FIG. 4, are all assumed to be low-active.

The synchronizing signal generating section 211 notifies a synchronizing signal to the display IF section 214, the bus access control section 212 and the buffer control section 215 at time T1. The display IF section 214 receives an assertion of a synchronizing signal, and issues a reading request of video data which is stored in the buffer section 216, to the buffer control section 215, and reads out video data a and video data b, and outputs the video data a to the display monitor a 400, and outputs the video data b to the display monitor b 500. The bus access control section 212 receives an assertion of a synchronizing signal, and requests a use right of the internal bus 230, to the memory interface 240, and receives use permission of the internal bus 230, from the memory interface 240, and then, reads out video data which is displayed in one cycle of a synchronizing signal, among video data which is stored in the local memory 300. Here, the synchronizing signal means a horizontal synchronizing signal, and the video data which is displayed in one cycle of a synchronizing signal is video data for one line of a screen which is displayed on the display monitor a 400.

The screen combining section 213 processes to combine video data which was read out from the local memory 300 through the internal bus 230, and video data which was read out from the buffer section 216 through the buffer control section 212, and stores a processing result in the buffer section 216 through the buffer control section 215, and completes combining processing of video data to be outputted to the display monitor a 400 at time T2.

In addition, the bus access control section 212 reads out video data for only determined number of screens from the local memory 300, in accordance with a screen combining parameter which is given by register setup etc. The screen combining section 213 processes to combine video data from the bus access control section 212, and video data which is stored in the buffer section 216, and carries out screen combining processing for storing video data, which becomes a processing result, in the buffer section 216, by the number of combined screens which was defined by register setup etc.

The bus access control section 212 receives a processing completion signal from the screen combining section 213, and reads out video data to be outputted to the display monitor b 500 at time T2, from the local memory 300 through the internal bus 230. The screen combining section 213 processes to combine video data which was read out through the internal bus 230, and video data which was read out from the buffer section 216 through the buffer control section 215, and stores video data, which is a processing result, in the buffer section 216 through the buffer control section 215, and completes combining processing of video data to be outputted to the display monitor b 500 at time T3. Here, processing completion time T3 of video data to be outputted to the display monitor b 500 has to be earlier than time T4 which is a next synchronizing signal assertion timing.

According to the display control apparatus described above, the bus access control section 212, the screen combining section 213, the buffer section 216 and the display IF section 214 of the display unit 210 handle video data for two screens, and thereby, it is possible to output respective video data to a plurality of display devices by use of one display unit, without disposing a plurality of display units, and therefore, it is possible to reduce a circuit size and cost.

Meanwhile, in the above-described explanation, a display control apparatus which displays independent screens on two display devices was taken as an example, but the number of display devices which can be connected is not limited to two, and it is all right if configurations of the buffer section and the synchronizing signal generating section are changed in accordance with the number of display devices to be connected.

In addition, in the above-described explanation, a display control apparatus in which the buffer section was configured by a line buffer was taken as an example, but by changing a place which is controlled by a horizontal synchronizing signal so as to be controlled by a vertical synchronizing signal, it is possible to realize a display control apparatus which is configured by a frame buffer.

Second Embodiment

Figure 5:
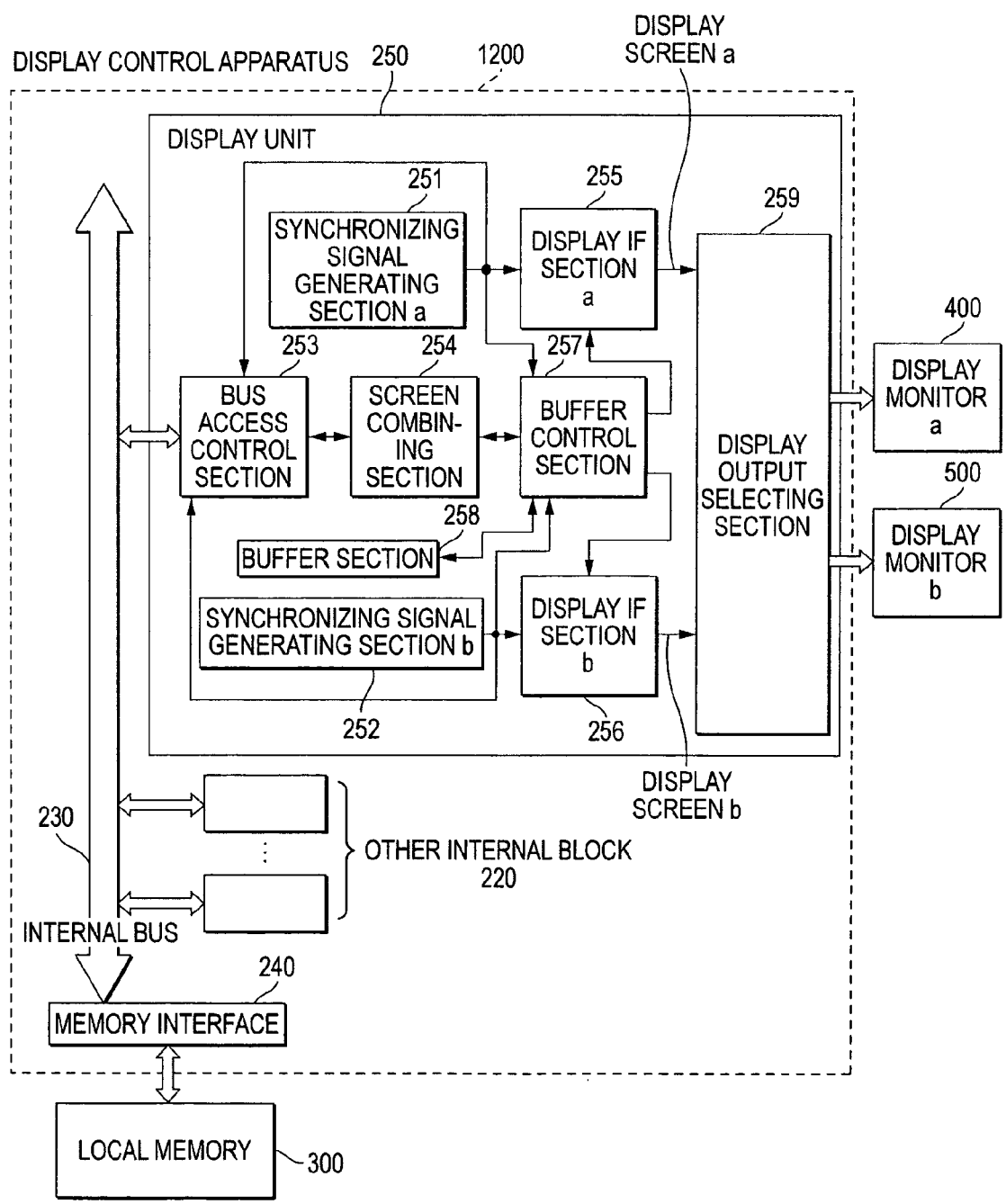
FIG. 5 is a schematic block diagram of a display control apparatus for explaining a second embodiment of the invention.

FIG. 5 is a schematic block diagram of a display control apparatus for explaining a second embodiment of the invention. In the same figure, identical reference numerals and signals are give to portions which overlap with FIG. 1 which was explained in the first embodiment. A display control apparatus 1200 is a thing which is equipped with a display unit 250 which displays an image on each of a plurality of display monitors (display monitors a 400, b 500) in accordance with a plurality of display synchronizing signals, and in which a local memory 300 which stores video data for a plurality of systems to be displayed on the display monitors a 400, b 500, and the display unit 250 are connected through an internal bus 230. The display monitor a 400 and the display monitor b 500 display screens with different screen sizes, respectively, and are things in which display of screens is controlled by different synchronizing signals.

The display unit 250 has synchronizing signal generating sections a 251, b 252 which generate a plurality of display synchronizing signals respectively, a bus access control section 253 having a function for reading video data for a plurality of systems from the local memory 300, one system at a time, a screen combining section 254 which processes to combine video data which was readout, and video data for use in combining, sequentially, a buffer section 258 which stores video data which was processed to be combined, and the video data for use in combining, and display IF sections a 255, b 256 which read out video data that the buffer section 258 stores, and outputs it to the display monitors a 400, b 500, respectively. The bus access control section 253 determines video data to be read out from the local memory 300, in accordance with the plurality of display synchronizing signals and a combining completion signal which shows whether combining processing for one system was completed or not. Meanwhile, in this embodiment, the bus access control section 253 identifies the signal which shows whether reading of video data for one system from the local memory 300 was completed or not, as the combining completion signal. The synchronizing signal generating sections a 251 and b 252 generate synchronizing signals which are adapted to the display monitors a 400 and b 500, respectively, and outputs the synchronizing signals to the bus access control section 253, the buffer control section 257 and the display IF sections a 255, b 256, respectively.

Figure 6:
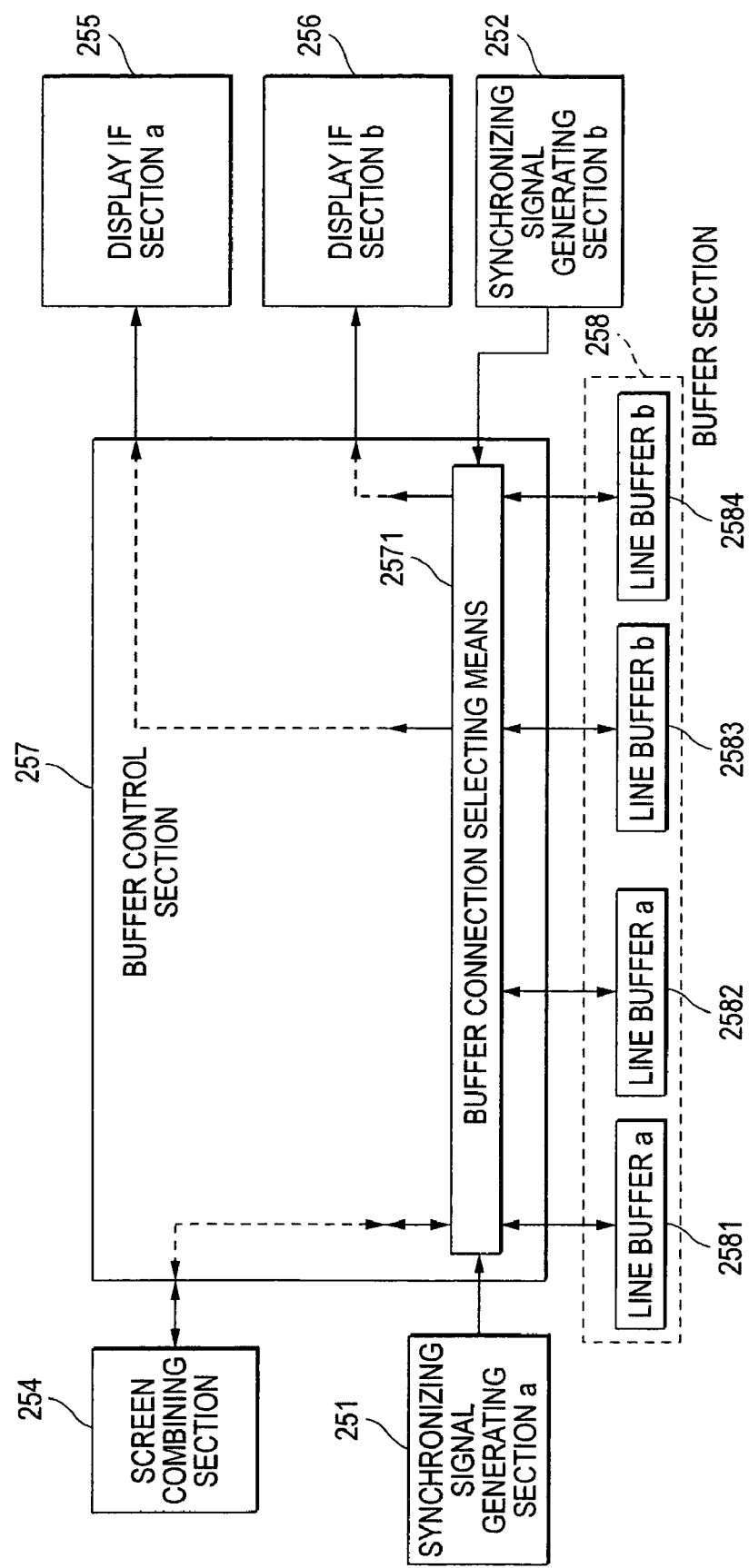
FIG. 6 is a view which explains the buffer section and the buffer control section in the second embodiment.

FIG. 6 is a view which explains the buffer section and the buffer control section in the second embodiment. The buffer section 258 is composed of a line buffer, and is connected to the screen combining section 254, the display IF section a 255 and the display IF section b 256, through the buffer control section 257. The buffer section 258 is composed of a line buffer a 2581 and a line buffer a 2582, which store video data to be outputted to the display monitor a 400, and a line buffer b 2583 and a line buffer b 2584, which store video data to be outputted to the display monitor b 500.

The buffer control section 257 is equipped with a buffer connection selecting means 2571 in its inside, and buffer connection selecting means 2571 connects any one of the line buffer a 2581 and the line buffer a 2582, to the display IF section a 255, and connects the other to the screen combining section 254, in accordance with a horizontal synchronizing signal a from the synchronizing signal generating section a 251. In the same manner, the buffer connection selecting means 2571 connects any one of the line buffer b 2583 and the line buffer b 2584, to the display IF section b 256, and connects the other to the screen combining section 254, in accordance with a horizontal synchronizing signal b from the synchronizing signal generating section b 252.

The bus access control section 253 determines video data to be next read out from the local memory 300, in accordance with a combining completion signal a which shows screen combining completion of one line among video data which is generated in the bus access control section 253 and is outputted to the display monitor a 400, and a combining completion signal b which shows screen combining completion of one line among video data which is generated in the bus access control section 253 and is outputted to the display monitor b 500.

Figure 7:
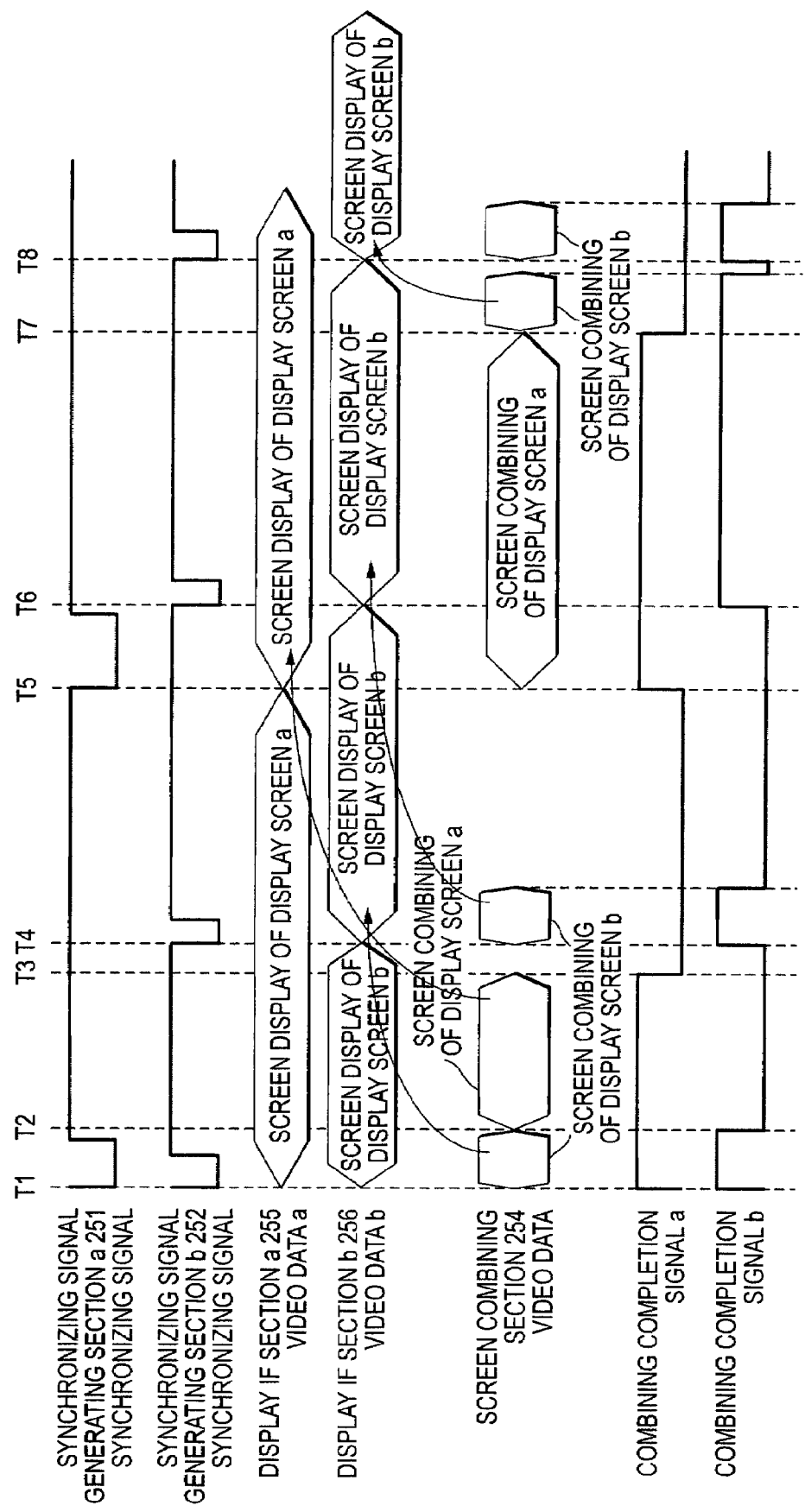
FIG. 7 is a timing chart for explaining an operation example of the display control apparatus shown in FIG. 5.

FIG. 7 is a timing chart for explaining an operation example of the display control apparatus shown in FIG. 5. Meanwhile, signals, which are described in FIG. 7, are all assumed to be low-active.

The synchronizing signal generating section a 251 notifies a synchronizing signal which corresponds to a screen to be displayed on the display monitor a 400, to the display IF section a 255, the bus access control section 253 and the buffer control section 257, at time T1. In addition, the synchronizing signal generating section b 252 notifies a synchronizing signal which corresponds to a screen to be displayed on the display monitor b 500, to the display IF section b 256, the bus access control section 253 and the buffer control section 257, at time T1. The bus control section 253 inputs plural systems synchronizing signals at the same time, from the synchronizing signal generating section a 251 and the synchronizing signal generating section b 252, at time T1, but since a synchronizing signal from the synchronizing signal generating section a 251 is asserted, it holds such a state that screen combining processing of video data to be displayed on the display monitor a 400 has not yet completed, and negates the combining completion signal a, and video data a turns into a processing waiting state. At the same time, since a synchronizing signal from the synchronizing signal generating section b 252 is asserted, it holds such a state that screen combining processing of video data to be displayed on the display monitor b 500 has not yet completed, and negates the combining completion signal b, and video data b turns into a processing waiting state. Meanwhile, the bus access control section 253 judges that combining processing was completed after predetermined time passed, on the basis of a monitoring signal which shows whether reading of video data for one system was completed or not.

The video data a and the video data b turn into a processing waiting state simultaneously at time T1, but the bus access control section 253 and the screen combining section 254 carries out screen combining of video data to be displayed on the display monitor b 500 with a smaller screen size in preference, and completes combining processing at time T2, and asserts the combining completion signal b, and turns into a processing completion state from the processing waiting state. Meanwhile, in case that the screen a and the screen b are of the same screen size, it is all right if priority is set up in advance. The bus access control section 253 and the screen combining section 254 starts screen combining of video data a which is in the processing waiting state, after video data b turned into the processing completion state at time T2, and completes combining processing at time T3, and asserts the combining completion signal a, and the video data a turns into a processing completion state.

Since both of the video data a and the video data b are in the processing completion state during a period from time T3 through T4, the bus access control section 253 waits ready until any one or both of the video data a or the video data b turn into the processing waiting state next. At time T4, a synchronizing signal from the synchronizing signal generating section b 252 is asserted, and the bus access control section 253 negates the combining completion signal b, and only the video data b turns into a waiting state, and therefore, the bus access control section 253 and the screen combining section 254 process the video data b. After that, at time T5, the combining completion signal a is negated, and combining processing of the video data b has been already completed and the combining completion signal b is asserted, and therefore, the bus access control section 253 and the screen combining section 254 carry out combining processing to the video data a which is in the processing waiting state.

On one hand, since a synchronizing signal from the synchronizing signal generating section a 251 is asserted at time T1, T5, the display IF section a 255 reads out video data from the buffer section 258 through the buffer control section 257 at this timing, and outputs it to the display monitor a 400. In addition, since a synchronizing signal from the synchronizing signal generating section b 252 is asserted at time T1, T4, T6, T8, the display IF section b 256 reads out video data from the buffer section 256 through the buffer control section 257 at this timing, and outputs it to the display monitor b 500.

Figure 8:
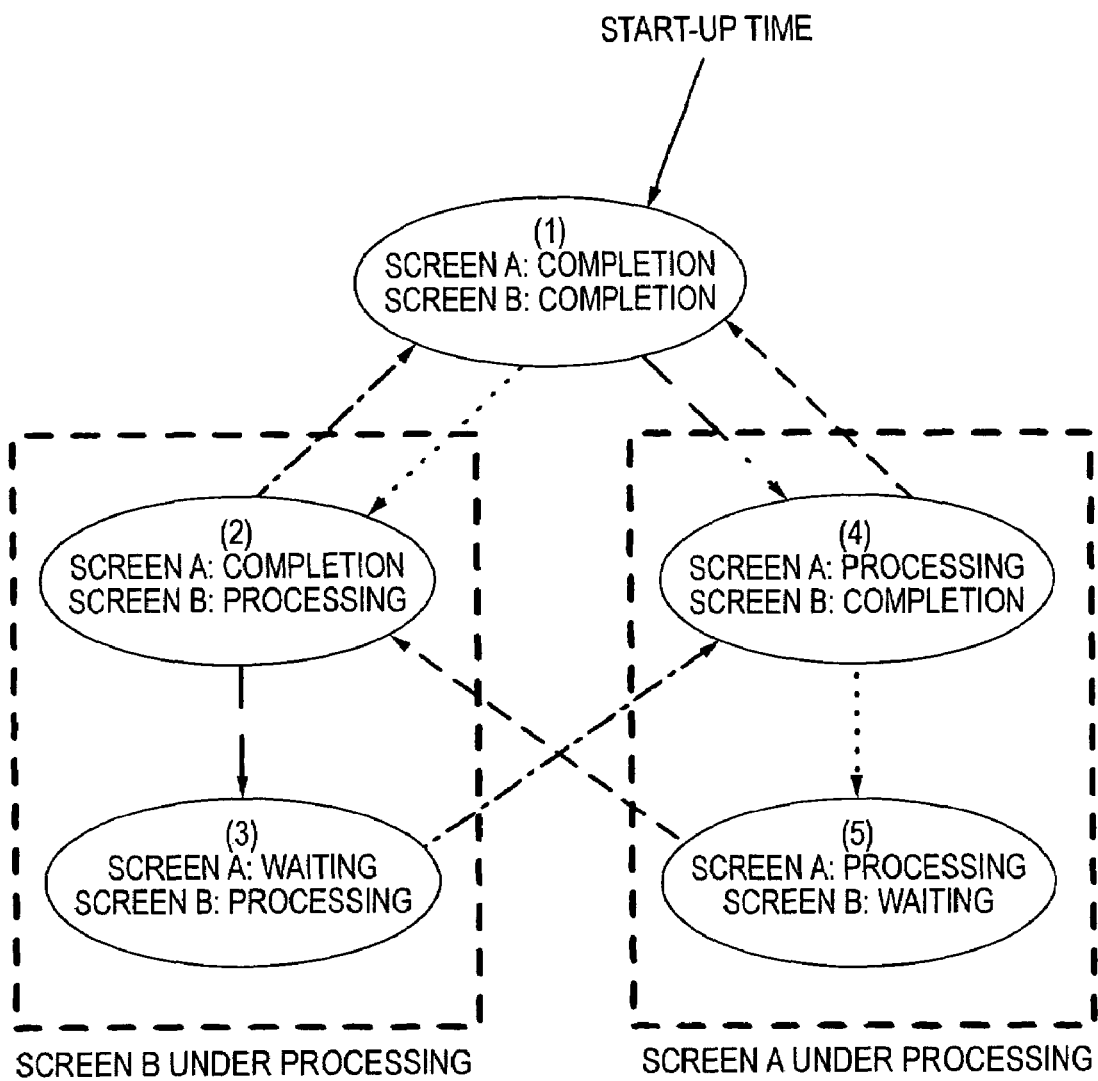
FIG. 8 is a view for explaining an operation example of the display control apparatus shown in FIG. 5.
Figure 9:
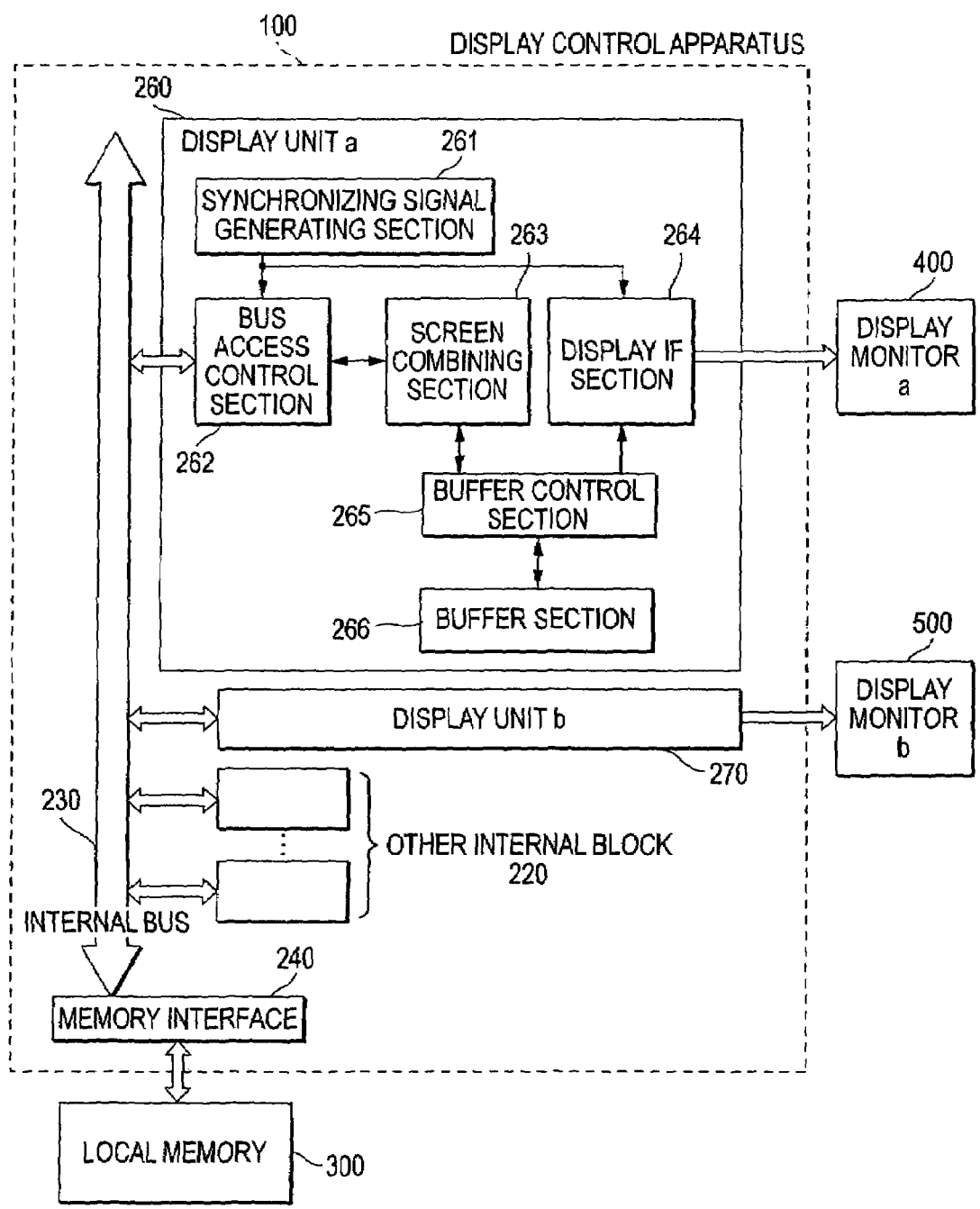
FIG. 9 is a schematic block diagram of one example of a related display control apparatus.

FIG. 8 is a view for explaining an operation example of the display control apparatus shown in FIG. 5. In FIG. 8, (1) through (5) show an operating state of the display monitors a, b (screens A, B). (1) shows a state at the time of start-up, and both of the screens A, B are in a state of waiting for a horizontal synchronizing signal. In this state, in case that a horizontal synchronizing signal of the screen A and a horizontal synchronizing signal of the screen B were inputted at the same time, an input of a horizontal synchronizing signal of a smaller screen width takes precedence. In a state of (2), processing of the screen A has been completed, and a horizontal synchronizing signal is waited. On the other hand, the screen B is under processing. Meanwhile, in this state, a horizontal synchronizing signal of the screen B is a prohibited input, and in case that a horizontal synchronizing signal of the screen B was supposedly inputted, processing is to be broken down.

In a state of (3), a horizontal synchronizing signal of the screen A is inputted, but the screen B is under combining processing, and therefore, the screen A turns into a waiting state. The screen B is under processing. In this state, as to both of the screen A and the screen B, a horizontal synchronizing signal is a prohibited input. In the states of (2) and (3), the screen B is under processing. In a state of (4), processing of the screen B has been completed, and a horizontal synchronizing signal is waited. On one hand, the screen A is under processing. Meanwhile, in this state, a horizontal synchronizing signal of the screen A is a prohibited input, and in case that a horizontal synchronizing signal of the screen A was supposedly inputted, processing is to be broken down. In a state of (5), a horizontal signal of the screen B is inputted, but the screen A is under combining processing, and therefore, the screen B turns into a waiting state. The screen A is under processing. In this state, as to both of the screen A and the screen B, a horizontal synchronizing signal is a prohibited input.

In the states of (4) and (5), the screen A is under processing.

Meanwhile, in case of time division processing in which each combining completion signal of the screen B does not exist, and processing of the screen B starts in wait for processing completion of the screen A, there exists no path for returning to (1) from (2) and (3). This is because, in this case, processing of (1)→(2)→(1)→(2), which can be occur in case that a screen width of the screen B is smaller than that of the screen A, becomes impossible.

According to the display control apparatus described above, the bus access control section 253 outputs a combining completion signal showing whether combining processing of video data for one system was completed or not (a signal which is outputted after predetermined time passed from reading completion, on the basis of a monitoring signal showing whether reading of video data for one system was completed or not), and thereby, even in case that a data amount of video data is different with respect to each system, the screen combining section 254 carries out processing for a next system, after combining processing of all video data for one system was completed, and there occurs no case that video data is outputted to a display monitor in such a state that combining processing of a part of video data has not yet completed, and therefore, even in case that screen sizes and display synchronizing signals of a plurality of display monitors are different, it is possible to output respective video data to a plurality of display monitors by use of one display unit without disposing a plurality of display units, and it is possible to reduce a circuit size and cost.

In the above-described explanation, in order to prevent processing of the display control apparatus from being broken down, it is necessary that processing ability of a screen combining side is sufficiently high. In particular, it is conditional on such a fact that operating frequency of screen combining and video data reading is sufficiently large as compared with screen display dot clock frequency, or that a bus band width of a local bus is sufficiently large, etc.

In addition, in the above-described explanation, a display control apparatus which displays independent screens on two display devices was taken as an example, but the number of display devices which can be connected is not limited to two, and it is all right if configurations of the buffer section and the synchronizing signal generating section are changed in accordance with the number of display devices to be connected.

In addition, in the above-described explanation, a display control apparatus in which the buffer section was configured by a line buffer was taken as an example, but by changing a place which is controlled by a horizontal synchronizing signal so as to be controlled by a vertical synchronizing signal, it is possible to realize a display control apparatus which is configured by a frame buffer.

In addition, in the above-described explanation, as the signal which shows whether screen combining was completed or not, a signal, which shows whether reading (transfer) of video data for one system was completed or not, is used, but any signal may be used if it is a signal which can monitor screen combining completion.

In an image display apparatus and an image display method of the invention, a bus access control section, a screen combining section, a buffer section and a display IF section of a display unit handle video data for a plurality of systems, and thereby, it is possible to output respective video data to a plurality of display devices by use of one display unit without disposing a plurality of display units. Therefore, it has such an advantage that it is possible to reduce a circuit size and cost, and it is useful for a technology etc. for displaying an image on each of a plurality of display devices, such as, for example, a car navigation system and a portable information terminal having a plurality of displays.

What is claimed is:

1. A display control apparatus having a display unit which displays an image simultaneously on each of a plurality of display devices with identical image size in accordance with an identical display synchronizing signal, and in which a local memory, which stores video data for a plurality of systems being displayed on the plurality of display devices, and the display unit are connected through an internal bus,
   wherein the display unit comprises:
   a synchronizing signal generating section which generates the display synchronizing signal;
   a bus access control section which reads out the video data for a plurality of systems, one system at a time by line from the local memory;
   a screen combining section which processes to combine the video data which was read out, and video data for use in combining, by line sequentially;
   a line buffer section which stores video data which was processed to combine, and the video data for use in combining by line, respectively; and
   a display interface section which reads out, by line, video data that the line buffer section stores, in accordance with the display synchronizing signal, and outputs the video data simultaneously to the plurality of display devices, respectively.

2. The display control apparatus according to claim 1, wherein the display unit comprises a converter which applies digital/analog conversion to at least one of the video data for a plurality of systems, which the display interface section outputs.

3. The display control apparatus according to claim 1, wherein the display unit comprises output destination selecting means which selects an output destination of the video data for a plurality of systems, which the display interface section outputs.

4. The display control apparatus according to claim 1, wherein the display interface section accesses the buffer section in a time division manner.

5. The display control apparatus according to claim 1, wherein the display interface section accesses the buffer section simultaneously.

6. A display control apparatus having a display unit which displays an image simultaneously on each of a plurality of display devices with identical image size in accordance with a plurality of display synchronizing signals, respectively, and in which a local memory, which stores video data for a plurality of systems being displayed on the plurality of display devices, and the display unit are connected through an internal bus,
   wherein the display unit comprises:
   a plurality of synchronizing signal generating sections which generate the plurality of display synchronizing signals, respectively;
   a bus access control section which reads out the video data for a plurality of systems, one system at a time by line from the local memory;
   a screen combining section which processes to combine the video data which was read out, and video data for use in combining, by line sequentially;
   a line buffer section which stores video data which was processed to combine, and the video data for use in combining by line, respectively; and
   a display interface section which reads out, by line, video data that the line buffer section stores, in accordance with each of the plurality of display synchronizing signals, and outputs the video data simultaneously to the plurality of display devices, respectively, and
   wherein the bus access control section determines video data which is read out from the local memory in accordance with the plurality of display synchronizing signals and a signal which shows whether combining processing for one system has completed or not.

7. The display control apparatus according to claim 6, wherein the display unit comprises a converter which applies digital/analog conversion to at least one of the video data for a plurality of systems, which the display interface section outputs.

8. The display control apparatus according to claim 6, wherein the display unit comprises output destination selecting means which selects an output destination of the video data for a plurality of systems, which the display interface section outputs.

9. The display control apparatus according to claim 6, wherein the display interface section accesses the buffer section in a time division manner.

10. The display control apparatus according to claim 6, wherein the display interface section accesses the buffer section simultaneously.

11. A display control method which displays an image simultaneously on each of a plurality of display devices with identical screen size in accordance with an identical display synchronizing signal, comprising:
    a read-out step which reads out video data for a plurality of systems, which are displayed on the plurality of display devices, one system at a time by line;
    a combining processing step which processes to combine video data which was read out, and video data for use in combining, by line sequentially; and
    an output step which reads out, by line, video data which was processed to be combined, in accordance with the display synchronizing signal, and outputs the video data simultaneously to each of the plurality of display devices.

12. The display control method according to claim 11, comprising a conversion step which applies digital/analog conversion to at least one of the video data for a plurality of systems, which was outputted to each of the plurality of video devices.

13. A display control method which displays an image simultaneously on each of a plurality of display devices with identical screen size in accordance with a plurality of display synchronizing signals, comprising:
   a readout step which reads out video data for a plurality of systems, which are displayed on the plurality of display devices, one system at a time by line;
   a combining processing step which processes to combine video data which was read out, and video data for use in combining, by line sequentially; and
   an output step which reads out, by line, video data which was processed to be combined, in accordance with each of the plurality of display synchronizing signals, and outputs the video data simultaneously to each of the plurality of display devices,
   wherein the readout step determines video data which is read out in accordance with the plurality of display synchronizing signals and a signal which shows whether combining processing for one system was completed or not.

14. The display control method according to claim 13, comprising a conversion step which applies digital/analog conversion to at least one of the video data for a plurality of systems, which was outputted to each of the plurality of video devices.

* * * * *